US012675731B2

(12) United States Patent
Kokel et al.

(10) Patent No.: US 12,675,731 B2
(45) Date of Patent: Jul. 7, 2026

(54) ACTION SPACE REDUCTION FOR PLANNING DOMAINS

(71) Applicant: International Business Machines Corporation, Armonk, NY (US)

(72) Inventors: Harsha Kokel, Richardson, TX (US); Junkyu Lee, San Diego, CA (US); Michael Katz, Goldens Bridge, NY (US); Shirin Sohrabi Araghi, Briarcliff Manor, NY (US); Kavitha Srinivas, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 17/660,036

(22) Filed: Apr. 21, 2022

(65) Prior Publication Data

US 2023/0342653 A1 Oct. 26, 2023

(51) Int. Cl.
G06N 20/00 (2019.01)
G06N 7/01 (2023.01)

(52) U.S. Cl.
CPC .............. G06N 20/00 (2019.01); G06N 7/01 (2023.01)

(58) Field of Classification Search
CPC ................................ G06N 20/00; G06N 7/01
See application file for complete search history.

(56) References Cited

U.S. PATENT DOCUMENTS

| | | | |
|---|---|---|---|
| 9,747,550 B2 | 8/2017 | Hassanzadeh | |
| 10,475,537 B2 | 11/2019 | Purdie | |
| 10,783,441 B2 | 9/2020 | Riabov | |
| 11,030,561 B2 | 6/2021 | Chang | |
| 11,061,718 B2 | 7/2021 | Vukovic | |
| 11,237,933 B2 | 2/2022 | Riabov | |
| 2013/0185119 A1 | 7/2013 | Palao | |
| 2015/0227589 A1* | 8/2015 | Chakrabarti | G06F 16/24564 |
| | | | 707/748 |
| 2019/0265703 A1 | 8/2019 | Hicok | |
| 2021/0004741 A1 | 1/2021 | Katz | |
| 2021/0089958 A1* | 3/2021 | Theocharous | G06N 3/092 |
| 2021/0216879 A1 | 7/2021 | Katz | |

(Continued)

OTHER PUBLICATIONS

Sievers, Silvan. "Merge-and-shrink heuristics for classical planning: Efficient implementation and partial abstractions." Proceedings of the International Symposium on Combinatorial Search. vol. 9. No. 1. 2018 (Year: 2018).*

(Continued)

*Primary Examiner* — Andrew T McIntosh
(74) *Attorney, Agent, or Firm* — Anthony Curro

(57) ABSTRACT

Technology for: (i) receiving a domain-dependent artificial intelligence planning problem including definitions for a plurality of operators; (ii) creating an initial version of a label set, which defines an initial version of an action space, with the label set including a plurality of labels, and with each label of the plurality of labels respectively corresponding to the operators of the plurality of operators; (iii) performing, automatically and by machine logic, a label reduction on the initial version of the label set to obtain a reduced version of the label set that defines a reduced action space; and (iv) recasting the artificial planning problem as a first Markov decision process using the reduced version of label set.

15 Claims, 2 Drawing Sheets

250

(56) References Cited

U.S. PATENT DOCUMENTS

2021/0326695 A1*  10/2021  Vitebsky ............... H04W 28/22
2022/0253743 A1*   8/2022  Wang ..................... G06N 10/60
2023/0016233 A1*   1/2023  Gubbi Lakshminarasimha ..........
                                                    G06N 20/00
2024/0330301 A1   10/2024  Kokel et al.

OTHER PUBLICATIONS

Robinson, Nathan, Sheila A. McIlraith, and David Toman. "Query Optimization Revisited: An AI Planning Perspective." SPARK 2013 (Year: 2013).*

Bao, et al., "Deep Learning-based Job Placement in Distributed Machine Learning Clusters", In IEEE InfoCom 2019—IEEE Conference on Computer Communications, Apr. 2019, pp. 505-513.

Botea, et al., "Macro-FF: Improving AI Planning with Automatically Learned Macro-Operators", Journal of Artificial Intelligence Research, 24, Oct. 2005, 41 pgs.

Boutilier, et al., "Symbolic Dynamic Programming for First-Order MDPs", IJCAI International Joint Conference on Artificial Intelligence, Feb. 11, 2002, 8 pgs.

Dong, et al., "Neural Logic Machines", Published as a conference paper at ICLR 2019, Apr. 26, 2019, 22 pgs., arXiv:1904.11694v1 [cs.AI].

Dulac-Arnold, et al., "Fast Reinforcement Learning with Large Action Sets Using Error-Correcting Output Codes For MDP Factorization", In Joint European Conference on Machine Learning and Knowledge Discovery in Databases, Springer, Berlin, Heidelberg, Aug. 25, 2018, 10 pgs., arXiv:1203.0203v1 [cs.LG].

Dzeroski, et al., "Relational Reinforcement Learning", Machine Learning, 43, 2001, 46 pgs, 2001 Kluwer Academic Publishers, Manufactured in The Netherlands.

Fern, et al., "Approximate Policy Iteration with a Policy Language Bias", Advances in Neural Information Processing Systems 16 (NIPS 2003), 8 pgs.

Gehring, et al., "Reinforcement Learning for Classical Planning: Viewing Heuristics as Dense Reward Generators", PRL Workshop at ICAPS 2021, Sep. 30, 2021, 15 pgs., arXiv:2109.14830v1 [cs.AI].

Jiang, et al., "Neural Logic Reinforcement Learning", Proceedings of the 36 th International Conference on Machine Learning, Long Beach, California, PMLR 97, Jul. 10, 2019, 10 pgs., arXiv:1904.10729v2 [cs.LG].

Rivlin, et al., "Generalized Planning with Deep Reinforcement Learning", May 6, 2020, 13 pgs., arXiv:2005.02305v1 [cs.AI].

Silver, et al., "PDDLGym: Gym Environments from PDDL Problems", MIT Computer Science and Artificial Intelligence Laboratory, Sep. 17, 2020, 8 pgs., arXiv:2002.06432v2 [cs.AI].

Vallati, et al., "On the Importance of Domain Model Configuration for Automated Planning Engines", Journal of Automated Reasoning, arXiv:2010.07710v1 [cs.AI], Oct. 15, 2020, 49 pgs.

Zahavy, et al., "Learn What Not to Learn: Action Elimination with Deep Reinforcement Learning", 32nd Conference on Neural Information Processing Systems (NeurIPS 2018), Montreal, Canada, 2018, 12 pgs.

Appendix P—List of IBM Patents or Patent Applications Treated as Related, Filed herewith, 2 Pages.

Backstrom, Christer, "Complexity Results for SAS Planning", Computational Intelligence, vol. 11, Nov. 4, 1995, 34 pages.

Bamford, Christopher et al., "Generalising Discrete Action Spaces with Conditional Action Trees", 2021 IEEE Conference on Games (CoG), Aug. 17-20, 2021, 8 pages.

Boutilier, Craig et al., "Planning and Learning with Stochastic Action Sets", Proceedings of the Twenty-Seventh International Joint Conference on Artificial Intelligence (IJCAI-18), Jul. 13-19, 2018, 9 pages.

Correa, Augusto B. et al., "Delete-Relaxation Heuristics for Lifted Classical Planning", Proceedings of the Thirty-First International Conference on Automated Planning and Scheduling (ICAPS 2021), Aug. 2-13, 2021, 9 pages.

Correa, et al., "Lifted Successor Generation Using Query Optimization Techniques", Proceedings of the Thirtieth International Conference on Automated Planning and Scheduling (ICAPS 2020), Jun. 1, 2020, 10 pgs.

Fiser, Daniel, "Lifted Fact-Alternating Mutex Groups and Pruned Grounding of Classical Planning Problems", Thirty-Fourth AAAI Conference on Artificial Intelligence (AAAI-20), Feb. 7-12, 2020, 8 pages.

Gefen, Avitan et al., "The Minimal Seed Set Problem", Proceedings of the Twenty-First International Conference on Automated Planning and Scheduling (ICAPS 2011), Jun. 11-16, 2011, 4 pages.

Geiber, Florian et al., "Trial-Based Heuristic Tree Search for MDPs with Factored Action Spaces", Thirteenth International Symposium on Combinatorial Search (SoCS 2020), May 26-28, 2020, 10 pages.

Guestrin, Carlos et al., "Coordinated Reinforcement Learning", Nineteenth International Conference on Machine Learning (ICML-2002), Jul. 8-12, 2002, 8 pages.

Haslum, Patrik, "Computing Genome Edit Distances using Domain-Independent Planning", Proceedings of the Twenty-First International Conference on Automated Planning and Scheduling (ICAPS 2011), Jun. 11-16, 2011, 7 pages.

Helmert, Malte et al., "Merge-and-Shrink Abstraction: A Method for Generating Lower Bounds in Factored State Spaces", Journal of the ACM, vol. 61, No. 3, Article 16, May 2014, 63 pages.

Helmert, Malte et al., "The Fast Downward Planning System", Journal of Artificial Intelligence Research 26 (2006) 191-246, Jul. 2006, 56 pages.

Helmert, Malte, "Concise finite-domain representations for PDDL planning tasks", Artificial Intelligence, vol. 173, Nos. 5/6, 503-535, Apr. 2009, 33 pages.

Hoffman, Matthew W. et al., "Acme: A Research Framework for Distributed Reinforcement Learning", arXiv:2006.00979v2 [cs.LG], Sep. 20, 2022, 36 pages.

Huang, Shengyi et al., "A Closer Look at Invalid Action Masking in Policy Gradient Algorithms", Thirty-Fifth International Florida AI Research Society Conference (FLAIRS 2022), May 15-18, 2022, 6 pages.

Kanervisto, Anssi et al., "Action Space Shaping in Deep Reinforcement Learning", 2020 IEEE Conference on Games (CoG 2020), Aug. 24-27, 2020, 8 pages.

Kokel, et al., "How to Reduce Action Space for Planning Domains? (Student Abstract)", The Thirty-Sixth AAAI Conference on Artificial Intelligence (AAAI-22), Jun. 28, 2022, 2 pgs.

Kokel, et al., "Identification of Actions in Artificial Intelligence Planning", filed Mar. 28, 2023, U.S. Appl. No. 18/127,357, 54 pgs.

Lauer, Pascal et al., "Polynomial-Time in PDDL Input Size: Making the Delete Relaxation Feasible for Lifted Planning", Proceedings of the Thirtieth International Joint Conference on Artificial Intelligence (IJCAI-21), Aug. 19-27, 2021, 8 pages.

Matloob, Rami et al., "Exploring Organic Synthesis with State-of-the-Art Planning Techniques", Scheduling and Planning Applications woRKshop (SPARK) at ICAPS, Jun. 14, 2016, 10 pages.

Mcdermott, Drew, "The 1998 AI Planning Systems Competition", AI Magazine vol. 21 No. 2, Summer 2000, Jun. 15, 2000, 22 pages.

Nelson, Mark J., "Estimates for the Branching Factors of Atari Games", 2021 IEEE Conference on Games (CoG), Aug. 17-20, 2021, 5 pages.

Pazis, Jason et al., "Reinforcement Learning in Multidimensional Continuous Action Spaces", IEEE Symposium on Adaptive Dynamic Programming and Reinforcement, Apr. 11-15, 2011, 8 pages.

Riabov, Anton et al., "Planning-Based Reasoning for Automated Large-Scale Data Analysis", Proceedings of the Twenty-Fifth International Conference on Automated Planning and Scheduling, Jun. 7-11, 2015, 9 pages.

Sievers, Silvan et al., "Generalized Label Reduction for Merge-and-Shrink Heuristics", Proceedings of the Twenty-Eighth AAAI Conference on Artificial Intelligence (AAAI-14), Jul. 27-31, 2014, 9 pages.

Sohrabi, Shirin et al., "An AI Planning Solution to Scenario Generation for Enterprise Risk Management", Thirty-Second AAAI Conference on Artificial Intelligence (AAAI-18), Feb. 2-7, 2018, 8 pages.

(56) References Cited

OTHER PUBLICATIONS

Sohrabi, Shirin et al., "Hypothesis Exploration for Malware Detection using Planning", Proceedings of the Twenty-Seventh AAAI Conference on Artificial Intelligence, Jul. 14-18, 2013, 7 pages.

Sohrabi, Shirin et al., "State Projection via AI Planning", Proceedings of the Thirty-First AAAI Conference on Artificial Intelligence (AAAI-17), Feb. 4-9, 2017, 7 pages.

Ullman, Jeffrey D., "Principles of Database and Knowledge-Base Systems, vol. II", Computer Science Press, Nov. 1, 1990, 3 pages.

Sohrabi, et al., Scenario Planning for Enterprise Risk Management, Proceedings of Application Showcase Program at the 27th International Conference on Automated Planning and Scheduling, Jun. 2017, 3 pages.

Horcik et al. 'Endomorphisms of Lifted Planning Problems, Proceedings of the Thirty-First International Conference on Automated Planning and Scheduling, May 17, 2021, 10 pages, vol. 31.

* cited by examiner

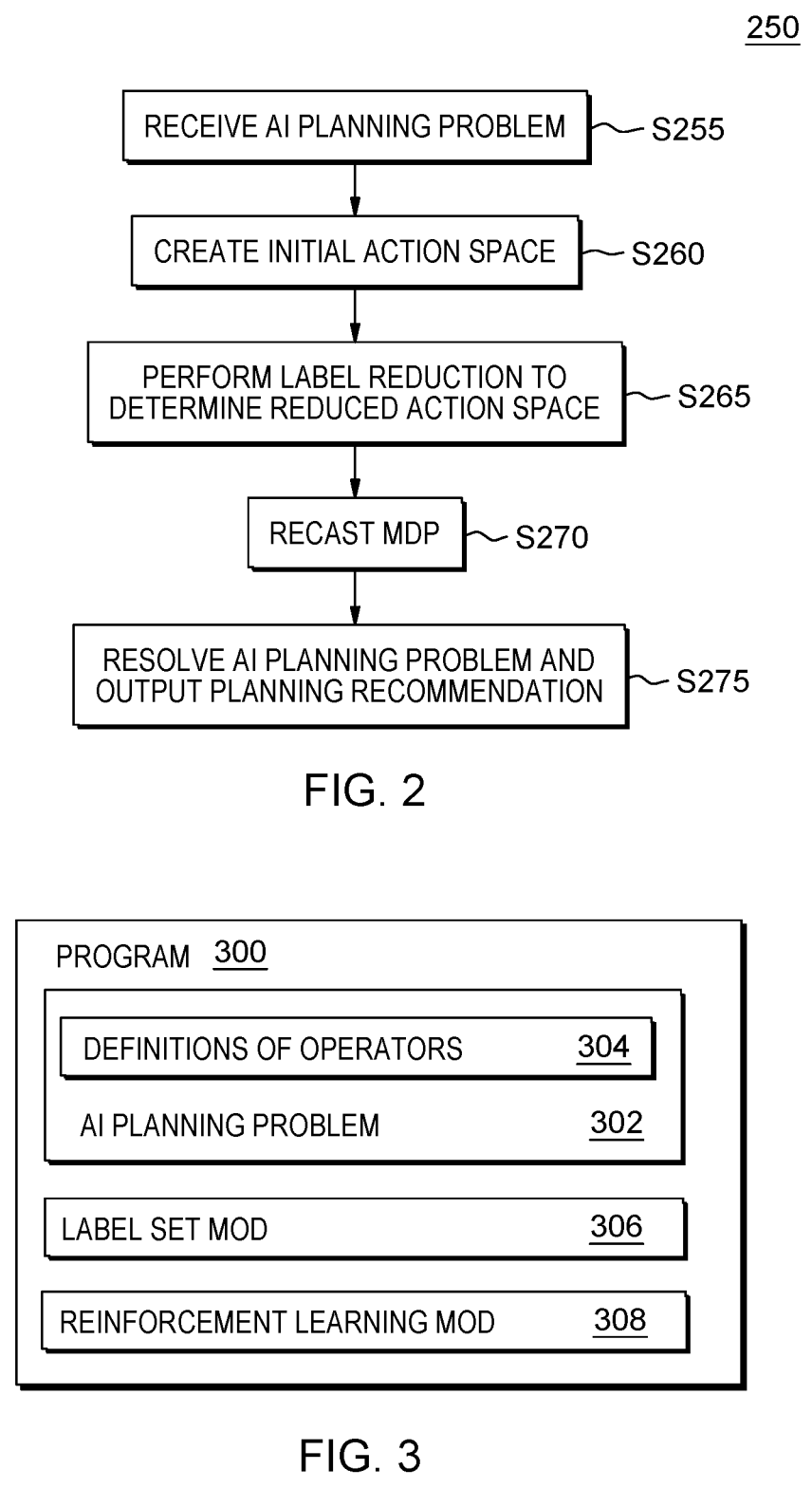

250

RECEIVE AI PLANNING PROBLEM — S255

CREATE INITIAL ACTION SPACE — S260

PERFORM LABEL REDUCTION TO DETERMINE REDUCED ACTION SPACE — S265

RECAST MDP — S270

RESOLVE AI PLANNING PROBLEM AND OUTPUT PLANNING RECOMMENDATION — S275

FIG. 2

PROGRAM 300

DEFINITIONS OF OPERATORS 304

AI PLANNING PROBLEM 302

LABEL SET MOD 306

REINFORCEMENT LEARNING MOD 308

FIG. 3

ACTION SPACE REDUCTION FOR PLANNING DOMAINS

BACKGROUND

The present invention relates generally to the field of computer technology for providing action spaces used by planning domains.

Two main subfields of AI (artificial intelligence) that deal with sequential decision making are Reinforcement Learning (RL) and AI Planning. Each of these approaches has their strong sides and their weaknesses. AI Planning is a model-based approach, relying on a symbolic model to guide the search for a solution. It does not require additional data beyond the symbolic model, is agnostic to the problem behind the model, and is able to scale to rather large instances. A pure RL system, on the other hand, does not require a symbolic model, but lacks the advantages of AI Planning, being extremely data hungry, domain specific, requiring adaptation and often retraining from scratch when moving to a sufficiently different task. There have been some efforts to combine AI Planning and RL techniques.

Planning domains, written in the Planning Domain Definition Language (PDDL), are fundamentally relational. These domains include constructs such as objects, predicates, and schematic operators (or lifted actions) with preconditions and effects written in first-order logic formulae. Hence, prior work that uses RL algorithms to solve planning tasks focus on relational Markov Decision Processes (MDPs). The action space (also referred to as a label set) used in a relational MDP is defined as ground head atoms of PDDL operators.

As of 4 Apr. 2022, the Wikipedia entry for Markov decision process states, in part, as follows: "In mathematics, a Markov decision process (MDP) is a discrete-time stochastic control process. It provides a mathematical framework for modeling decision making in situations where outcomes are partly random and partly under the control of a decision maker. MDPs are useful for studying optimization problems solved via dynamic programming . . . . They are used in many disciplines, including robotics, automatic control, economics and manufacturing. The name of MDPs comes from the Russian mathematician Andrey Markov as they are an extension of Markov chains. At each time step, the process is in some state $\{\displaystyle s\}s$, and the decision maker may choose any action $\{\displaystyle a\}a$ that is available in state $\{\displaystyle s\}s$. The process responds at the next time step by randomly moving into a new state $\{\displaystyle s'\}s'$, and giving the decision maker a corresponding reward $\{\displaystyle R_{a}(s,s')\}R\_a(s,s')$. The probability that the process moves into its new state $\{\displaystyle s'\}s'$ is influenced by the chosen action. Specifically, it is given by the state transition function $\{\displaystyle P_{a}(s,s')\}P\_a(s,s')$. Thus, the next state $\{\displaystyle s'\}s'$ depends on the current state $\{\displaystyle s\}s$ and the decision maker's action $\{\displaystyle a\}a$. But given $\{\displaystyle s\}s$ and $\{\displaystyle a\}a$, it is conditionally independent of all previous states and actions; in other words, the state transitions of an MDP satisfy the Markov property. Markov decision processes are an extension of Markov chains; the difference is the addition of actions (allowing choice) and rewards (giving motivation). Conversely, if only one action exists for each state (e.g. "wait") and all rewards are the same (e.g. "zero"), a Markov decision process reduces to a Markov chain."

As the term is used herein, a "mutex group" is defined as a set of operators out of which, maximally, one can be validly applied in any reachable state of objects involved in a computerized decision making process. The operators that form a mutex group are pairwise mutex. A mutex and a mutex group are both defined as invariants with respect to all states reachable from the initial state by a sequence of operators.

SUMMARY

According to an aspect of the present invention, there is a method, computer program product and/or system that performs the following operations (not necessarily in the following order): (i) receiving a domain-dependent artificial intelligence planning problem including definitions for a plurality of operators; (ii) creating an initial version of a label set, which defines an initial version of an action space, with the label set including a plurality of labels, and with each label of the plurality of labels respectively corresponding to the operators of the plurality of operators; (iii) performing, automatically and by machine logic, a label reduction on the initial version of the label set to obtain a reduced version of the label set that defines a reduced action space; and (iv) recasting the artificial planning problem as a first Markov decision process using the reduced version of label set.

BRIEF DESCRIPTION OF THE DRAWINGS

FIG. 2 is a flowchart showing a first embodiment method performed, at least in part, by the first embodiment system; and FIG. 3 is a block diagram showing a machine logic (for example, software) portion of the first embodiment system.

DETAILED DESCRIPTION

Figure 1:
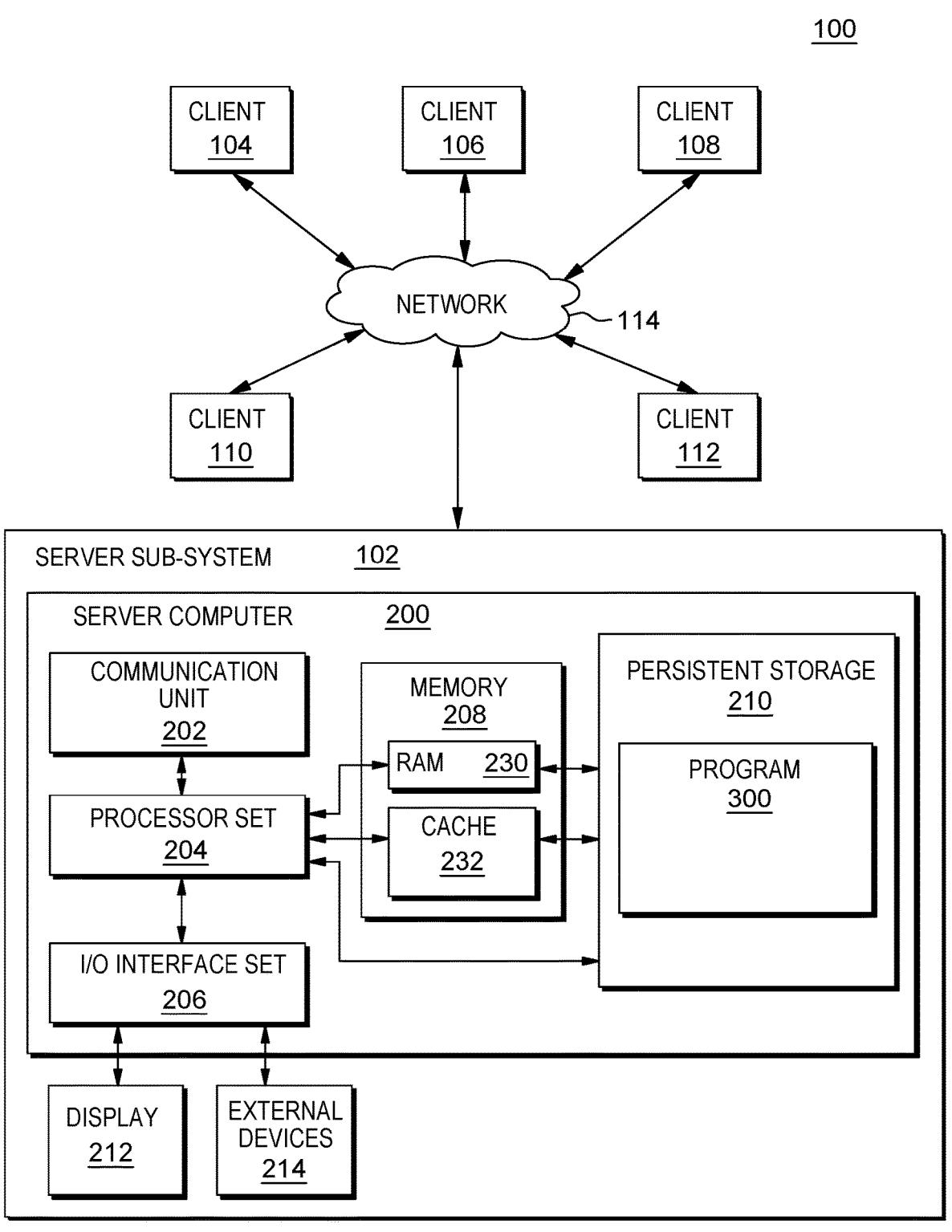
FIG. 1 is a block diagram of a first embodiment of a system according to the present invention.

While Planning and Reinforcement Learning (RL) solve similar problems, their action spaces (also referred to as label sets) vary significantly. When tackling planning problems with RL approaches, the large planning action label sets become a serious obstacle. The labels are often reduced manually in a domain specific manner. Some embodiments of the present invention provide an automated way of reducing action label sets by casting the operator parameter reduction as a classical planning problem. Some embodiments have the advantage of a significant reduction in the size of the action label set and results in improved sample efficiency while learning RL policies. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where domain-dependent artificial intelligence planning problem 302 is received. More specifically, what is meant by "domain-dependent" here is that the planning problem is described in a domain-independent language (such as PDDL), but it is noted that a typical planning problem typically encodes a sequential decision making problem for a particular domain. Some examples are as follows: transportation logistics problems, elevators high-level operation, greenhouse logistics operation, spacecraft operation, and genetics related computation. Domain-dependent artificial intelligence planning problem 304 definitions for a plurality of operators 304. It is noted that a label reduction will be valid if, and only if, it is directed to distinct labels to any two operators that can be applied in every reachable state. It is noted that the information included in domain-dependent artificial intelligence planning problem 302 does not need to be received at the same time or from the same informational source.

Processing proceeds to operation S260, where label set module ("mod") 306 creates an initial version of a label set, which defines an initial version of an action space, with the label set including a plurality of labels, and with each label of the plurality of labels respectively corresponding to the operators of the plurality of operators 304.

Processing proceeds to operation S265, where mod 306 performs, automatically and by machine logic, a label reduction on the initial version of the label set to obtain a reduced version of the label set that defines a reduced action space. As discussed in detail in the next sub-section of this Detailed Description section, this label reduction may involve the determination and use of mutex groups corresponding to the operators.

Processing proceeds to operation S270, where reinforcement learning mod 308 recasts the artificial planning problem as a first Markov decision process using the reduced version of label set.

Processing proceeds to operation S275, where mod 308 resolves the artificial intelligence planning problem to obtain a first planning recommendation by performing reinforcement learning using the discrete-time stochastic control process of the first Markov decision process using the reduced action space defined by the reduced version of the label set.

III. Further Comments and/or Embodiments

Some embodiments of the present invention recognize one, or more, of the following facts, potential problems and/or potential areas for improvement with respect to the current state of the art: (i) as the number of objects increases in the planning problem, the number of grounded operators, and thus actions in the relational MDP, also increases; (ii) the number of objects leads to a proliferation of permutations, which, in turn, leads to expensive computations and inefficient learning; (iii) to remedy the issue noted in the foregoing item, some known techniques have either generated the action label sets of MDP manually without using the PDDL operator set or have performed manual operator parameter reduction, eliminating the distinction between labels of some ground operators and using the reduced labels as MDP action set; (iv) PDDL operator encodes its applicability and transition dynamics as the precondition and effects but MDP actions are mere labels and the transition dynamics are encoded by a transition function; and/or (v) this semantic difference potentially means that some of the parameters defined in PDDL operators turn out not to be essential for RL action labels.

Some embodiments of the present invention may include one, or more, of the following operations, features, characteristics and/or advantages: (i) an automated way of performing a label reduction that includes leveraging existing methods for discovering lifted mutex groups; (ii) introduction of definitions of valid label reduction and applicable operator mutex groups, with the definitions showing the connection between the two; (iii) automatic derivation, by computer machine logic, of operator label reductions for planning tasks based on operator parameter reduction (in this aspect, the problem of obtaining a seed set of operator parameters is formally defined); (iv) solving the problem by: (a) translating the problem to delete-free planning terms, and (b) exploring the space of plans to obtain a seed set of high quality; and/or (v) significant reduction in operator labels, which translates into improved performance of standard RL agents on the tested problems.

Lifted mutex groups will now be discussed. A mutex group is a set of mutually exclusive ground predicates M. At any given state s, that that can be reached from state I, at most one of the ground predicates making up the mutex group can be TRUE. Any subset of a mutex group is also a mutex group. A Lifted Mutex Group (LMG) is a set of lifted predicates that produces a mutex group when grounded. Formally, a lifted mutex group is defined using an invariant candidate. An invariant candidate is defined as a tuple having three elements as follows: (i) a set of fixed variables; (ii) a set of counted variables; and (iii) a set of atoms.

Reinforcement Learning (RL) will now be discussed. An RL problem is defined as a Markov decision process (that is, M) that includes an associated set of states, set of actions, transition function, reward function, and discount factor. A planning definition language task is casted as an instance of an MDP with state space expressed in a language (that is, L) as a power set of predicates and constants, with the MDP including an action set as the set of grounded head atoms from the grounded operators, a transition function as a PDDL action simulator, and a reward function. The reward function is expressed as: (i) a positive real number when a goal specification is satisfied by the state; (ii) negative real number when the goal specification is not satisfied (or some variation thereof).

Operator Label Reduction (OLR, or, reducing an action space) will now be discussed. More particularly, a set of criteria for valid and effective operator label reduction will now be discussed. In some embodiments, a main motivation is to reduce the set of operator labels of planning tasks when described as an MDP. A label reduction is valid if it assigns distinct labels to any two operators that can be applied in every reachable state. As an example of two operators that are not applicable in any common state, two operators that would respectively require an object of interest to be in two different rooms cannot be applied in the context of a common, single state. Thus, assigning a common label to both of them would be valid. As an example of two operators that are not applicable in at least one common state, two operators are applicable an object of interest when it is located in a given room will be applicable in a common state (that is any state where the object of interest is actually located in the given room). For this reason, the same action label cannot validly be assigned to both of these operators.

This is because the action space must be able to distinguish applicable operators. In other words, for each reduced label, the set of corresponding operators must include at most one applicable operator for each reachable state s. Note the resemblance to predicate mutex groups. Such operator sets are called applicable operator mutex groups.

A given set of operators may form an applicable operator mutex group (AOMG) for some reachable state s. Any subset of an AOMG is also an AOMG, and any subset of operators of size 1 is an AOMG. A partitioning of operators into AOMGs defines a valid operator label reduction, and vice versa, a valid operator label reduction defines a partitioning of operators into AOMGs. In order to find operator label reductions with as small as possible reduced label set size, operators are partitioned into a set of as few as possible AOMGs. A minimal set cover of size m can be greedily translated into an operator label reduction to a reduced set of labels of size m. Note that the minimal set cover would be done over the ground operator sets and their subsets and for larger planning problems may take a significant computational effort.

On the other hand, some embodiments of the present invention operate based on a different approach than that described in the previous paragraph. More specifically, the focus is on finding AOMGs via reduction of operator parameters. AOMGs are found separately for each (lifted) schematic operator. Removing some parameters from the schematic operator can provide an elegant way of finding pairwise non-intersecting AOMGs per schematic operator.

Such reductions can be found using LMGs, as will be explained below. Any (partial) parameter grounding defines a partitioning over the set of (ground) operators, where each partition corresponds to a particular assignment of constants to a subset of parameters. Thus, it is sought to identify a subset of schematic operator parameters such that each grounding of these parameters is an AOMG. Note that LMGs have very similar properties. Any assignment to their fixed variables is a mutex group. Thus, lifted mutex groups can be used for finding a subset of schematic operator parameters that can be uniquely identified from an assignment to the other parameters.

Some embodiments of the present invention may include one, or more, of the following characteristics, features, advantages and/or operations: (i) evaluates the advantage of reducing the action label set size by casting the PDDL task as an MDP with the reduced label set and learning an RL policy; (ii) because the objective is to evaluate the reduction of the action space, and not evaluation of the generalization of policies, the number of objects in each domain is fixed; (iii) uses a pre-existing PDDL library (for example, PDDLEnv4) to convert the PDDL domain and problem files to RL Environment; (iv) uses a domain-independent planning heuristic as a dense reward function for training purposes; (v) employs a Doubling DQN implementation from an ACME RL library to learn a state-action value function; (vi) applies a greedy policy; (vii) uses hyperparameters in the domains; (viii) We randomly generated 500 unique PDDL problem files; (ix) in experimental use, reduction of action labels was found to improve the sample efficiency by as many as 300,000 steps; (x) in blocks and logistics domains that are not able to learn a policy, become able to learn a policy once a reduced label set is used (that is, training becomes feasible where it previously was not); and/or (xi) reducing the action label set yields significant gain in terms of sample efficiency.

Some embodiments of the present invention may include one, or more, of the following characteristics, features, advantages and/or operations: (i) can be used for problem files, subjected to RL evaluation, that are considered as minuscule in planning terms, but these problems have sparse rewards and are difficult for RL agents to solve; (ii) even in such small-scale problems, where there are not too many labels to begin with and the reduction is not large in absolute terms, reducing the action labels is advantageous; and/or (iii) in large domains, with many objects, various embodiments of the present invention can potentially provide tremendous leverage for training RL algorithms.

Some embodiments use definitions of valid label reduction and applicable operator mutex groups in performing label reduction. Some embodiments are directed to a method for automatically deriving operator label reductions for planning tasks based on operator parameter reduction. For that, a parameter seed set problem may be introduced, and a solution to the problem can be suggested by translating it to delete-free planning. Some embodiments can facilitate a significant reduction in operator labels, across all planning domains. This reduction can translate into improved performance of standard RL agents.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) to save computer resources in execution of reinforcement learning artificial intelligence software, the CIM comprising:
   receiving a domain-dependent artificial intelligence planning problem including definitions for a plurality of operators, the domain-dependent artificial intelligence planning problem a model-based approach relying on a symbolic model to guide a search for a solution to the domain-dependent artificial intelligence planning problem;
   creating an initial version of a label set, which defines an initial version of an action space, with the label set including a plurality of labels, and with each label of the plurality of labels respectively corresponding to the operators of the plurality of operators;
   performing, automatically and by machine logic, a label reduction on the initial version of the label set to obtain a reduced version of the label set that defines a reduced action space;
   recasting the artificial planning problem as a first Markov decision process, the first Markov decision process using the reduced version of the label set generated by the machine logic; and
   resolving the artificial intelligence planning problem relying on the symbolic model and outputting a planning recommendation by performing reinforcement learning using the first Markov decision process with the reduced version of the label set generated by the machine logic.

2. The CIM of claim 1 wherein the performance of the label reduction includes:
   determination, by machine logic, of a mutex group of operators from the plurality of operators; and
   using the mutex group of state dependent operators to reduce a number of labels in the reduced version of the action space relative to a number of labels in the original version of the action space.

3. The CIM of claim 1 further comprising:
   translating the artificial intelligence planning problem to delete-free planning terms.

4. The CIM of claim 1 further comprising:
   exploring the space of plans to obtain a seed set of high quality.

5. The CIM of claim 1 wherein the performance of label reduction includes:
   finding a mutex group via reduction of operator parameters, such that the mutex group is found separately for each operator of the plurality of operators.

6. A computer program product (CPP) to save computer resources in execution of reinforcement learning artificial intelligence software, the CIM comprising:
   a set of storage device(s); and
   computer code stored collectively in the set of storage device(s), with the computer code including data and instructions to cause a processor(s) set to perform at least the following operations:
   receiving a domain-dependent artificial intelligence planning problem including definitions for a plurality of operators, the domain-dependent artificial intelligence planning problem a model-based approach relying on a symbolic model to guide a search for a solution to the domain-dependent artificial intelligence planning problem,
   creating an initial version of a label set, which defines an initial version of an action space, with the label set including a plurality of labels, and with each label of the plurality of labels respectively corresponding to the operators of the plurality of operators,
   performing, automatically and by machine logic, a label reduction on the initial version of the label set to obtain a reduced version of the label set that defines a reduced action space;
   recasting the artificial planning problem as a first Markov decision process, the first Markov decision process using the reduced version of the label set generated by the machine logic; and
   resolving the artificial intelligence planning problem relying on the symbolic model and outputting a planning recommendation by performing reinforcement learning using the first Markov decision process with the reduced version of the label set generated by the machine logic.

7. The CPP of claim 6 wherein the performance of the label reduction includes:
   determination, by machine logic, of a mutex group of operators from the plurality of operators; and
   using the mutex group of state dependent operators to reduce a number of labels in the reduced version of the action space relative to a number of labels in the original version of the action space.

8. The CPP of claim 6 wherein the computer code further includes instructions for causing the processor(s) set to perform the following operation(s):
   translating the artificial intelligence planning problem to delete-free planning terms.

9. The CPP of claim 6 wherein the computer code further includes instructions for causing the processor(s) set to perform the following operation(s):
   exploring the space of plans to obtain a seed set of high quality.

10. The CPP of claim 6 wherein the performance of label reduction includes:
   finding a mutex group via reduction of operator parameters, such that the mutex group is found separately for each operator of the plurality of operators.

11. A computer system (CS) to save computer resources in execution of reinforcement learning artificial intelligence software, comprising:
   a processor(s) set;
   a set of storage device(s); and computer code stored collectively in the set of storage device(s), with the computer code including data and instructions to cause the processor(s) set to perform at least the following operations:

receiving a domain-dependent artificial intelligence planning problem including definitions for a plurality of operators, the domain-dependent artificial intelligence planning problem a model-based approach relying on a symbolic model to guide a search for a solution to the domain-dependent artificial intelligence planning problem, creating an initial version of a label set, which defines an initial version of an action space, with the label set including a plurality of labels, and with each label of the plurality of labels respectively corresponding to the operators of the plurality of operators, performing, automatically and by machine logic, a label reduction on the initial version of the label set to obtain a reduced version of the label set that defines a reduced action space;

recasting the artificial planning problem as a first Markov decision process, the first Markov decision process using the reduced version of the label set generated by the machine logic; and resolving the artificial intelligence planning problem relying on the symbolic model and outputting a planning recommendation by performing reinforcement learning using the first Markov decision process with the reduced version of the label set generated by the machine logic.

12. The CS of claim 11 wherein the performance of the label reduction includes:

determination, by machine logic, of a mutex group of operators from the plurality of operators; and using the mutex group of state dependent operators to reduce a number of labels in the reduced version of the action space relative to a number of labels in the original version of the action space.

13. The CS of claim 11 wherein the computer code further includes instructions for causing the processor(s) set to perform the following operation(s):

translating the artificial intelligence planning problem to delete-free planning terms.

14. The CS of claim 11 wherein the computer code further includes instructions for causing the processor(s) set to perform the following operation(s):

exploring the space of plans to obtain a seed set of high quality.

15. The CS of claim 11 wherein the performance of label reduction includes:

finding a mutex group via reduction of operator parameters, such that the mutex group is found separately for each operator of the plurality of operators.

* * * * *